United States Patent
Hicks et al.

(10) Patent No.: US 7,827,795 B2
(45) Date of Patent: Nov. 9, 2010

(54) ACTIVE THERMAL PROTECTION FOR FUEL INJECTORS

(75) Inventors: Paul G. Hicks, Holland, MI (US); Fei Philip Lee, Holland, MI (US)

(73) Assignee: Woodward Governor Company, Fort Collins, CO (US)

( * ) Notice: Subject to any disclaimer, the term of this patent is extended or adjusted under 35 U.S.C. 154(b) by 0 days.

(21) Appl. No.: 12/233,697

(22) Filed: Sep. 19, 2008

(65) Prior Publication Data

US 2010/0071667 A1    Mar. 25, 2010

(51) Int. Cl.
*F02C 1/00*     (2006.01)
(52) U.S. Cl. .................................. 60/728; 60/39.83
(58) Field of Classification Search ............. 60/728, 60/734, 740, 742, 746–748, 266, 39.83
See application file for complete search history.

(56) References Cited

U.S. PATENT DOCUMENTS

| | | | | |
|---|---|---|---|---|
| 3,662,959 A | * | 5/1972 | Sample, Jr. ............. | 239/533.2 |
| 3,668,869 A | * | 6/1972 | De Corso et al. ............. | 60/740 |
| 3,826,080 A | * | 7/1974 | De Corso et al. ............. | 60/39.55 |
| 3,834,160 A | * | 9/1974 | Moehring et al. ............. | 60/243 |
| 4,189,913 A | * | 2/1980 | Carlisle ............. | 60/787 |
| 4,409,791 A | * | 10/1983 | Jourdain et al. ............. | 60/240 |
| 4,441,323 A | | 4/1984 | Colley | |
| 4,891,935 A | * | 1/1990 | McLaurin et al. ............. | 60/800 |
| 5,099,644 A | * | 3/1992 | Sabla et al. ............. | 60/207 |
| 5,185,997 A | * | 2/1993 | Nishijima ............. | 60/806 |
| 5,297,391 A | | 3/1994 | Roche | |
| 5,473,881 A | * | 12/1995 | Kramnik et al. ............. | 60/772 |
| 5,735,115 A | * | 4/1998 | Maghon ............. | 60/804 |
| 5,867,976 A | * | 2/1999 | Ziegler, Jr. ............. | 60/803 |
| 5,873,237 A | * | 2/1999 | Medla et al. ............. | 60/800 |

(Continued)

FOREIGN PATENT DOCUMENTS

DE     4127455 A1     2/1993

(Continued)

OTHER PUBLICATIONS

U.S. Appl. No. 12/194,597, filed Aug. 20, 2008, Smith.

(Continued)

*Primary Examiner*—Michael Cuff
*Assistant Examiner*—Phutthiwat Wongwian
(74) *Attorney, Agent, or Firm*—Reinhart Boerner Van Deuren P.C.

(57) ABSTRACT

A fuel injector and turbine engine incorporating the fuel injector are provided. The fuel injector includes an active cooling system that insulates fuel flowing through the fuel injector from heat energy within the turbine engine. The cooling system includes a cooling air passage that includes an inlet and an outlet. The inlet and outlet are in fluid communication with the interior of an engine case of the turbine engine. The inlet is at a higher air pressure location than the outlet such that air is siphoned through the cooling air passage. A portion of the cooling air passage includes a heat exchanger for extracting heat energy from the cooling air. The cooling air passes through the fuel injector after it has passed through the heat exchanger. The heat exchanger is positioned external to the engine case and in thermal communication with the ambient.

20 Claims, 3 Drawing Sheets

U.S. PATENT DOCUMENTS

| | | |
|---|---|---|
| 6,149,075 A | 11/2000 | Moertle et al. |
| 6,584,778 B1 * | 7/2003 | Griffiths et al. ............... 60/782 |
| 6,877,306 B2 | 4/2005 | Wernberg et al. |
| 2002/0134084 A1 * | 9/2002 | Mansour et al. ............... 60/740 |
| 2004/0118119 A1 | 6/2004 | Martling et al. |
| 2007/0283931 A1 | 12/2007 | Mao |
| 2008/0066720 A1 | 3/2008 | Piper et al. |
| 2009/0126687 A1 | 5/2009 | Paterson |
| 2009/0165435 A1 * | 7/2009 | Koranek ................... 60/39.463 |

FOREIGN PATENT DOCUMENTS

| | | |
|---|---|---|
| EP | 1 793 169 A2 | 6/2007 |
| JP | 8049513 A | 2/1996 |

OTHER PUBLICATIONS

U.S. Appl. No. 12/233,671, filed Sep. 19, 2008, Lee et al.
U.S. Appl. No. 12/199,376, filed Aug. 27, 2008, Hicks.
U.S. Appl. No. 12/569,996, filed Sep. 30, 2009, Smith.

* cited by examiner

ACTIVE THERMAL PROTECTION FOR FUEL INJECTORS

FIELD OF THE INVENTION

This invention generally relates to fuel delivery systems and more particularly to fuel injectors (i.e. fuel nozzles) for delivering fuel to combustion chambers for combustion engines.

BACKGROUND OF THE INVENTION

Fuel injectors (a.k.a. fuel nozzles) are important components of gas turbine engines. Because the fuel injector is the source of the fuel, the fuel injector can provide significant play in the role of engine performance.

Because the fuel injector is positioned, at least partially, within the engine case, a fuel injector includes a support/stem through which an internal fuel tube extends. The fuel tube will be connected to an atomizer or other tip member of the support/stem to improve the delivery state of the fuel so that it will more fully mix with air in the engine case. Typically, the fuel injector is positioned downstream of a compressor unit and upstream from a combustor of the turbine. Typically, the location between the compressor and the combustor in which, at least part of, if not a majority of, the fuel injector is located is referred to as a compressor discharge area.

During operation, the support/stem is surrounded by high-temperature and high-pressure compressor air. However, it is desirable to deliver the fuel at a much lower temperature than the high-temperature of the compressor air. More particularly, if too much heat is transferred to the fuel, the fuel can begin to coke, thereby ruining or reducing the quality of the fuel. Further, coking of the fuel can cause coke depositions in the fuel injector negatively effecting the fuel flow from the injector. The high heat also weakens the structural strength and exacerbates corrosion of the fuel nozzle.

As such, there have been many attempts to reduce the amount of heat that can be transferred from the high-temperature compressor air to fuel passing through the fuel injector. Typically, a heat shield is added that surrounds the stem/support providing a pocket of stagnant air around the support/stem to prevent or substantially reduce convection of heat to the support/stem.

Unfortunately, however, due to technology advances, thereby ever-increasing the harsh environment downstream of the compressor, the fuel injector is being exposed to and required to withstand higher environment temperatures, sometimes in excess of 1600 degrees Fahrenheit. Further, complicating the issue is the fact that fuel is being used more extensively as a heat sink or cooling agent for various systems, particularly in aircrafts, prior to consumption of the fuel. This is causing the fuel temperature as the fuel is being fed to the fuel injectors to rise sharply to 350 degrees Fahrenheit or higher, (i.e. prior to the fuel even entering the injector). Excessive temperature also weakens the strength and accelerates corrosion of the metal structures of the fuel nozzle. Typically, a fuel nozzle made of stainless steel losses strength noticeably at 800 degrees Fahrenheit and above, as does a fuel nozzle made of nickel alloy at 1200 degree Fahrenheit and above.

Due to these increases in temperature and sources of heat energy, standard heat shield/stagnant air arrangements are becoming less effective in preventing deleterious effects on the fuel.

The present invention relates to improvements over the current state of the art in fuel injectors.

BRIEF SUMMARY OF THE INVENTION

Embodiments of the present invention provide improved fuel injectors and turbine engines. In one embodiment, an improved fuel injector including an active cooling system is provided. Further yet, in an embodiment, an improved fuel injector including an active cooling system that siphons air from a compressor discharge area of a turbine through a cooling passage that cools the air and then passes it through the fuel injector is provided. Still further yet, an improved turbine engine that includes a cooling system that includes a cooling passage that has an inlet within a compressor discharge area and an outlet in a combustor as well as portion in thermal communication with the fuel injector is provided.

In more particular embodiments of the present invention, a fuel injector for use in a fuel combustion engine is provided. The fuel injector comprises a central body and a cooling system. The central body defines a fuel flow passage extending between a fuel inlet and a fuel outlet. The cooling system includes a cooling air passage extending between a cooling air inlet and a cooling air outlet. At least a portion of the cooling air passage extends through the central body and is in thermal communication with the central body.

In a preferred embodiment of the fuel injector, the central body includes a support structure and a heat shield surrounding, at least part of, the support structure forming a gap therebetween. The gap forms part of cooling air passage. Further yet, the cooling system preferably includes a heat exchanger interposed between the cooling air inlet and cooling air outlet.

In a further embodiment, an improved turbine engine comprising an engine case, a compressor, a compressor discharge area, a combustor, a fuel injector, and a cooling system is provided. The compressor is positioned within the engine case. The compressor discharge area is downstream of the compressor to which compressed air from the compressor is discharged at high pressure. The combustor is within the engine case and positioned downstream from the compressor and compressor discharge area in fluid communication with the compressor discharge area through a combustor boundary wall. The combustor boundary wall creates a pressure differential between the combustor discharge area and the combustor such that the combustor is at a lower pressure than the compressor discharge area. The fuel injector is mounted within to the engine case. The fuel injector includes a support structure defining a fuel flow path having a fuel outlet within the combustor. The cooling system includes a cooling air passage passing through and in thermal communication with the support structure. The cooling air passage includes a cooling air inlet in the compressor discharge area and a cooling air outlet in the combustor. At least one portion of the cooling air passage interposed between the cooling air inlet and cooling air outlet is external to the engine case.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
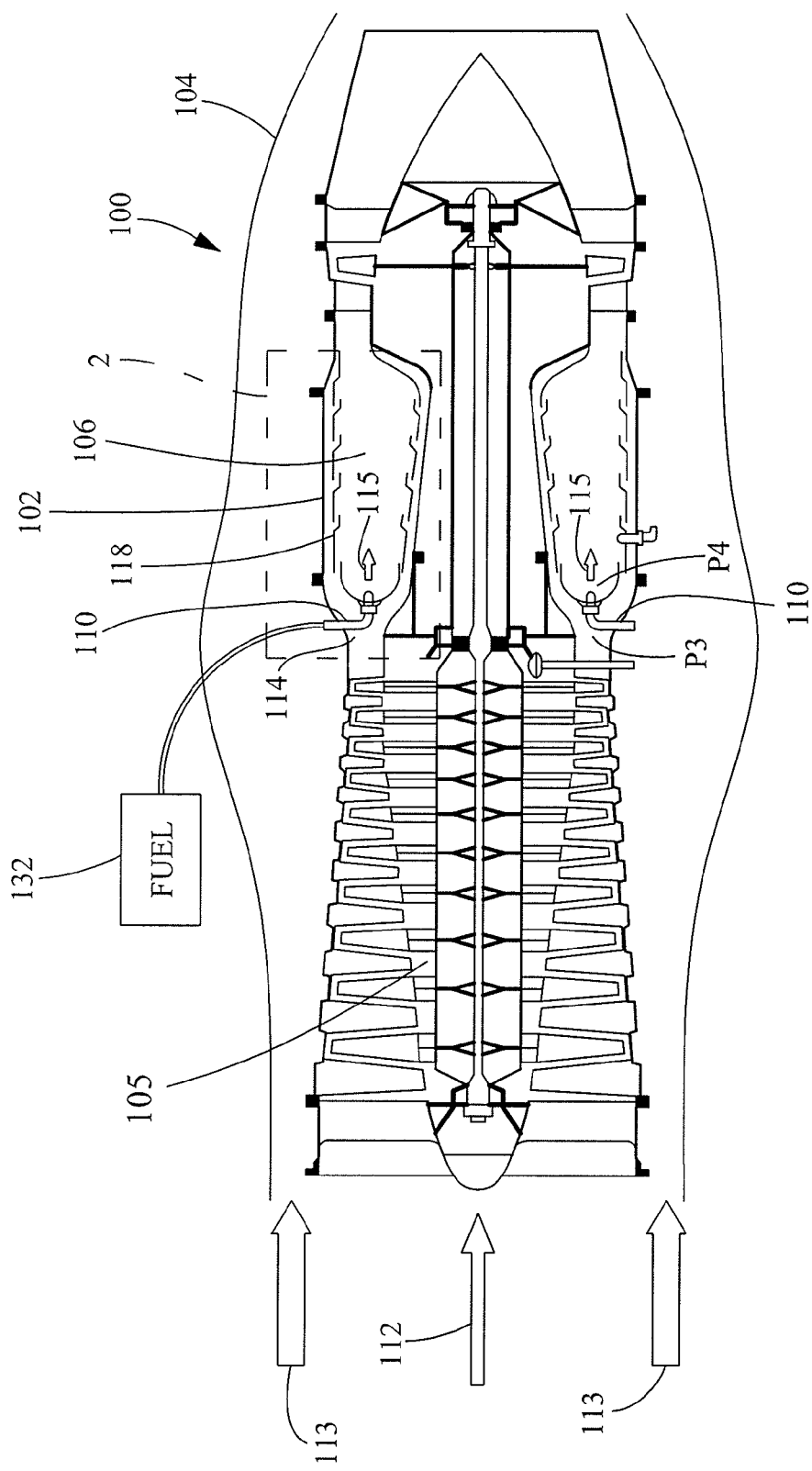
FIG. 1 is a simplified cross-sectional illustration of a turbine engine in accordance with the teachings of the present invention.
Figure 2:
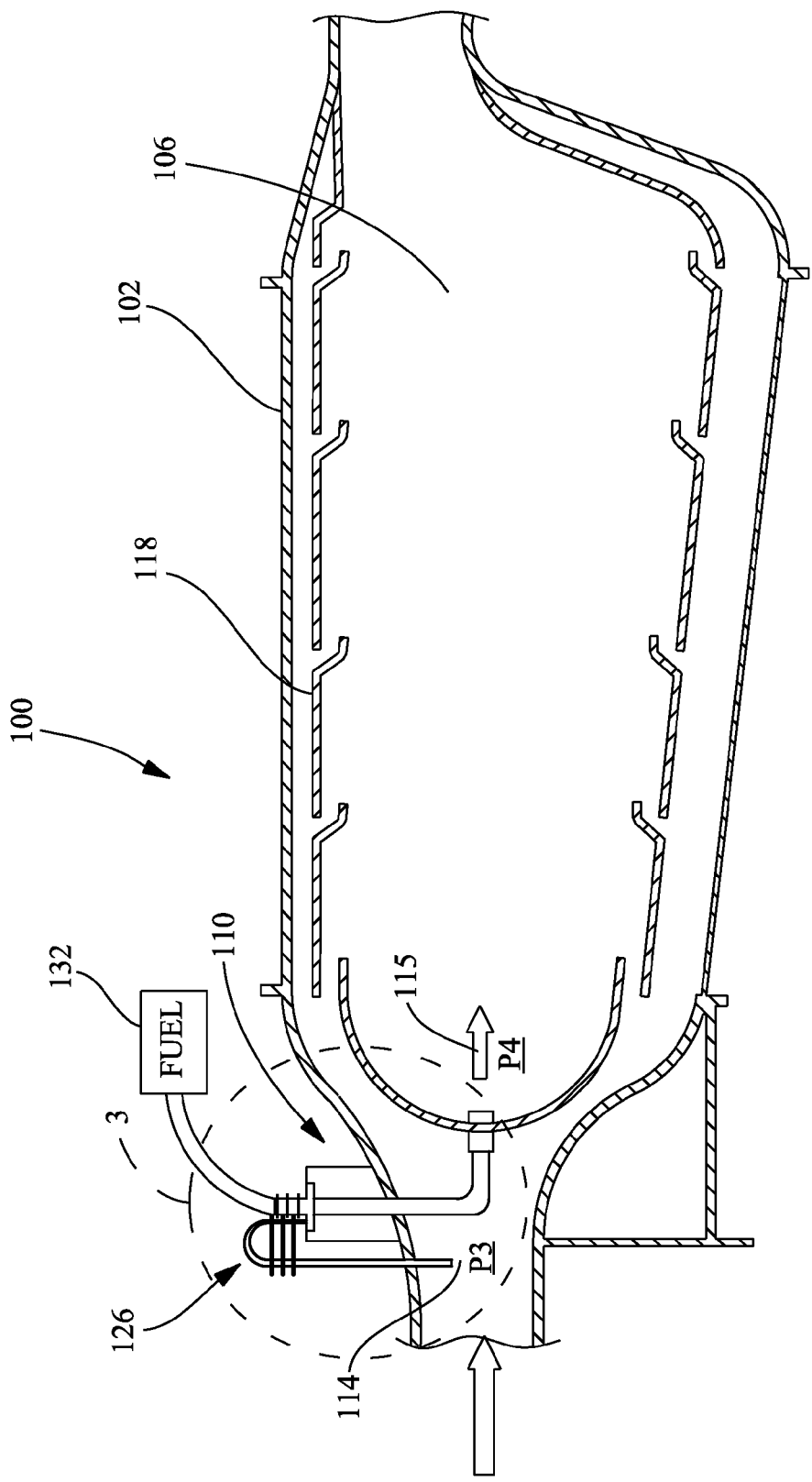
FIG. 2 is an enlarged partial cross-sectional illustration of the compressor discharge area and combustor of the turbine engine of FIG. 1.

Turning now to FIG. 1, a simplified illustration of a turbine engine 100 according to the teachings of the present invention is illustrated. The turbine engine 100 includes, among other things, an engine case 102 housed within a nacelle 104, i.e. a shroud surrounding the engine case 102, and other components that cause the turbine engine 100 to operate. Within the engine case 102, the turbine engine 100 includes a compressor 105, a combustor 106 or combustion chamber and a plurality of fuel injectors 110 (also referred to or known as fuel nozzles).

Atmospheric air, illustrated as arrow 112 enters compressor 105 and is compressed such that it exits into compressor discharge area 114 upstream of combustor 106. The compressed air within the compressor discharge area 114 is high-pressure and high temperature. The pressure of the compressor discharge area 114 will be referred to herein as pressure P3.

Downstream from the compressor discharge area 114 is the combustor 106 in which the high-temperature and high pressure air is mixed with fuel 115 that is injected into the combustor 106 via injector 110 and then combusted.

The combustor 106 is bounded by a combustor boundary wall 118 that acts as a flame shield and further defines the combustor 106 within engine case 102. The combustor boundary wall 118 includes apertures or holes through which the compressed air passes as it enters the combustor 106. The combustor boundary wall 118 slightly inhibits the flow of air from the compressor discharge area 114 into the combustor 106 and creates a pressure drop resulting in a pressure P4 within the combustor 106 proximate fuel injector 110. The pressure drop across the combustor boundary wall 118 is typically between about three percent (3%) and five percent (5%). As such, pressure P3 is typically between about three percent (3%) and five percent (5%) greater than pressure P4. Typically, P4 is several hundred PSI such that the pressure differential between pressure P3 and pressure P4 is between about six (6) and twelve (12) PSI. However, other pressure differentials can be created based on the design of combustor boundary wall 118.

Because the fuel injector 110 is exposed to the high-temperature compressed air exiting compressor 105 significant amount of heat energy can be transferred from the air to the injector 110. If too much of the heat energy from the air is transferred to the fuel passing though the injector 110, the fuel will begin to coke or otherwise degrade reducing the performance of the injector and the turbine 100.

Therefore, the fuel injector 110 of the present embodiment incorporates active cooling to assist in maintaining the fuel temperature of fuel passing through the fuel injector 110 below a predetermined acceptable level, generally a level that will prevent coking or other deterioration of the fuel.

Figure 3:
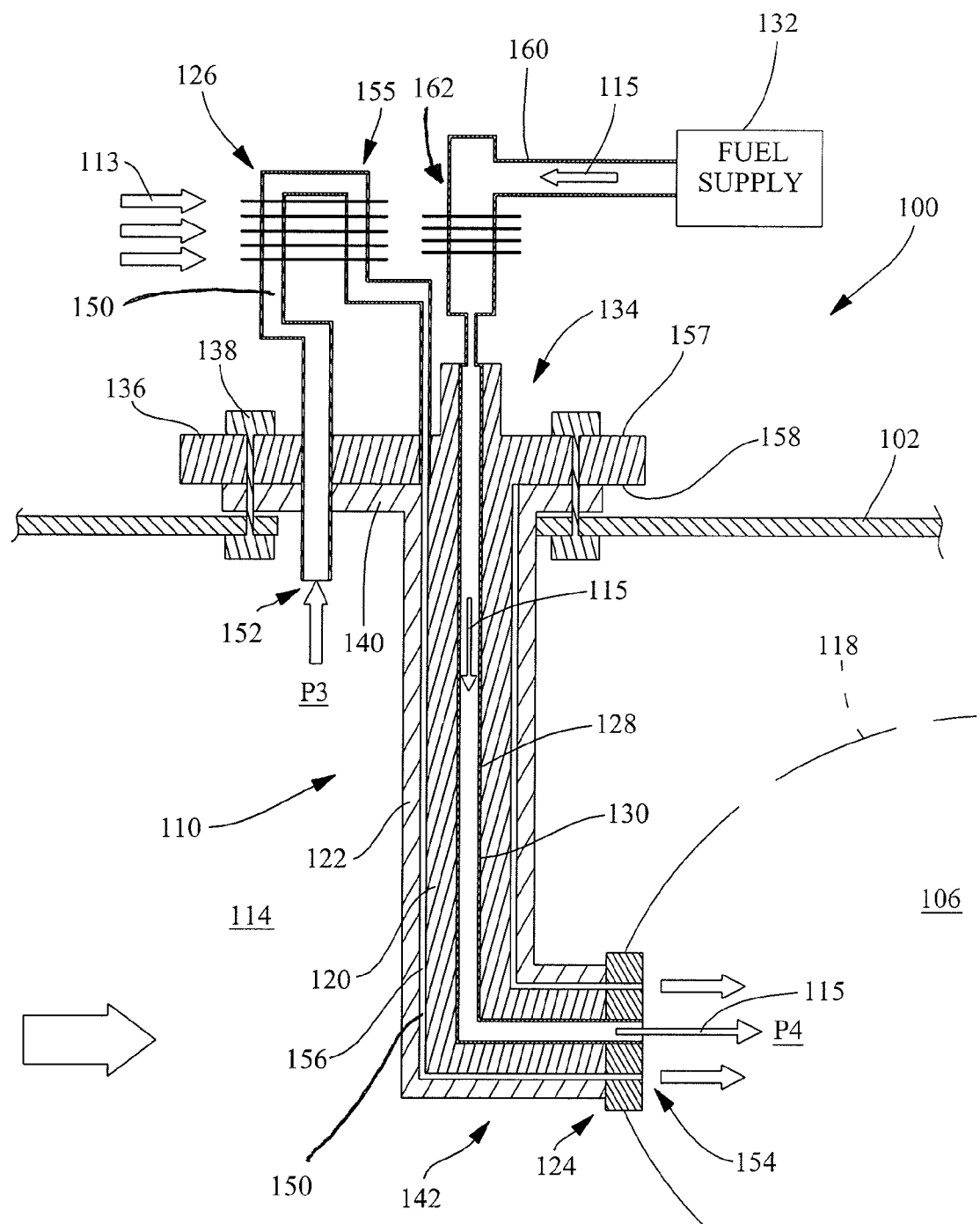
FIG. 3 is an enlarged schematic illustration of the fuel injector of FIG. 1.

With reference to the simplified cross-sectional illustration of FIG. 3, the fuel injector 110 generally includes a support structure illustrated in the form of a stem 120, a heat shield 122, a fuel atomizer 124, an active cooling system 126, and a fuel tube arrangement 128.

The stem 120 acts as a support for the fuel injector 110 and includes a central bore 130 through which fuel flows to atomizer 124. More particularly, fuel tube arrangement 128 is mounted within bore 130. The fuel tube arrangement 128 is illustrated as a single tube, however, in alternative embodiments, the fuel tube 128 could be provided by a plurality of concentric or non-concentric tubes depending on the type of fuel flow desired through the injector. The fuel tube arrangement 128 is operably coupled to a fuel supply source 132.

The stem 120 further includes a mounting head portion 134 to which the fuel supply 132 is connected. The mounting head portion 134 acts as an inlet to the fuel injector 110, while the fuel atomizer 124 is the outlet of the fuel injector 110. The mounting head portion 134 further includes a radially extending mounting flange 136 used to mount the fuel injector 110 to the engine case 102. In the illustrated embodiment, a plurality of bolts 138 pass through the engine case 102 and the mounting flange 136 to secure the fuel injector 110 to the engine case 102. However, other support structures may be used in practicing embodiments of the present invention. And the stem could be formed from a combination of a plurality of different components.

The heat shield 122 provides a first thermal barrier to oppose heat transfer from the high-temperature, high-pressure compressor air to the fuel 115 passing through the fuel injector 110. The heat shield 122 includes a mounting flange 140 that aligns with the mounting flange 136 of the stem 120 and is sandwiched between the engine case 102 and mounting flange 136 to secure the heat shield 122 in place.

At an opposite downstream or outlet end 142 of the fuel injector 110 is the atomizer 124. The fuel atomizer 124 is illustrated in simplified form, and could be excluded in embodiments of the invention or replaced with alternative structure for promoting mixture of the fuel 115 with the air within the combustor 106. The fuel atomizer 124 acts to promote mixing of the fuel 115 ejected from the injector 110 with the previously compressed air to increase performance of the turbine and promote improved combustion of the fuel 115. The outlet end 142 of the fuel injector 110, by way of the atomizer 124, is in fluid communication with combustor 106 and extends through combustor boundary wall 118.

Now that the general environment and structure of the turbine 100 and injector 110 have been identified, the active cooling system 126 will be more fully described.

The active cooling system 126 acts generally to reduce the amount of heat energy that is transferred from the high-temperature, high-pressure air exiting the compressor 105 to the fuel. More particularly, the active cooling system acts to reduce the heat energy transferred from the heat shield 122 to the stem 120 as compared to a standard arrangement where merely a stagnant air gap is formed between the heat shield 122 and stem 120. The active cooling system 126 acts to siphon upstream air within the compressor discharge area 114 through a cooling air passage 150 formed, at least in part, by a gap 156 formed between the stem 120 and the heat shield 122 of the fuel injector 110. As the air passes through the cooling air passage 150, the air is sufficiently cooled to increase its insulating capacity beyond that of merely providing a stagnant air gap.

The cooling air passage 150 includes an inlet 152 in the compressor discharge area 114 and an outlet 154 formed in the outlet end 142 of the fuel injector 110 that is in fluid communication with the combustor 106. This arrangement allows the high-pressure, high-temperature air in the compressor discharge area 114 to be forced through the cooling air passage 150 and discharged into the combustor 106 due to a pressure differential between the inlet and outlet 152, 154. More particularly, a pressure differential between the inlet 152 and the outlet 154 is created due to the three percent to five percent pressure differential between pressures P3 and P4. This air forced through the cooling air passage 150 will be referred to herein as "cooling air."

The cooling air passage 150 includes several primary portions interposed between the inlet 152 and outlet 154. More particularly, the cooling air passage 150 includes a heat transfer portion illustrated as heat exchanger 155 as well as a portion that passes through the fuel injector 110 illustrated as a gap 156 formed between the heat shield 122 and stem 120.

As cooling air that is forced through the cooling air passage 150 travels from the inlet 152 to the outlet 154, the cooling air exits the engine case 102 and then passes through heat exchanger 155, illustrated in the form of an air-to-air heat exchanger, that is external to the engine case 102. Preferably, the heat exchanger 155 is positioned within the turbine nacelle 104 and within low temperature nacelle air 113 flowing external to the engine case 102. The heat exchanger 155 transfers heat energy from the cooling air to the nacelle air 113, which as used herein may also be referred to as ambient air, to reduce the temperature of the cooling air.

Next, the cooling air, after it has been cooled by heat exchanger 155, enters fuel injector 110. More particularly, the cooling air passes into gap 156 formed between the heat shield 122 and stem 120. This cooling air therefore reduces the amount of heat transferred from the heat shield 122 to the stem 120.

After passing though gap 156, the cooling air is expelled into combustor 106 and is combusted with fuel 115.

As air is drawn from and expelled back into the engine case 102, the inlet and outlet 152, 154 of the cooling air passage 150 are both positioned on an engine case side of the mounting structure, i.e. mounting flange 136, of the fuel injector 110. This allows, both the inlet 152 and outlet 154 to be positioned within the engine case 102 when the fuel injector 110 is mounted thereto. The mounting flange 136 overlaps a portion of the engine case 102 and includes an upstream face 157 that faces away from the outlet end 142 and a downstream face 158 that faces outlet end 142.

While illustrated as passing through the mounting flanges 136, 140 of the stem 120 and heat shield 122, respectively, as well as the same aperture in the engine case 102 through which the fuel injector 110 extends, the first portion of the cooling air passage 150 could be radially spaced such that it does not pass through those structures. Instead, the passage could pass directly into the engine case 102 through an aperture formed specifically for the inlet portion of the cooling air passage 150.

Further, while the heat exchanger 155 was previously described as an air-to-air heat exchanger, other heat exchangers could be incorporated. For example, a cooling media in the form of a liquid could be used that passes through heat exchanger 155 and then transferred to another location for expelling the heat energy to the ambient air.

An additional feature of the present invention is that the fuel flow passage 160 acts to also reduce the temperature of the fuel 115 prior to entering the fuel injector 110. As such, the fuel flow passage 160 includes a heat exchanger 162 to remove heat energy from the fuel 115.

As mentioned previously, the fuel 115 can be used as a cooling agent for other components of the turbine engine 100. Thus, the heat exchanger 162 can be used to remove some of the heat energy absorbed by the fuel 115 from the other components prior to the fuel 115 being supplied to the fuel injector 110.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel injector for use in a gas turbine engine having an engine case housed within a nacelle, the engine case including therein a compressor for compressing atmospheric air to form high pressure and high temperature compressed air that flows into a compressor discharge area upstream of and for use by a combustor also housed in the engine case, the nacelle forming a nacelle air bypass flow path around the engine case to allow low temperature nacelle air to flow therethrough, the fuel injector comprising:

a central body defining a fuel flow passage extending between a fuel inlet and a fuel outlet;

a cooling system including at least one orifice that defined a cooling air passage extending between an orifice cooling air inlet located in the compressor discharge area and a cooling air outlet located in the combustor; at least a portion of the cooling air passage extending through the engine case and into the nacelle air bypass flow path around the engine case, the cooling air passage thereafter extending through the central body and in thermal communication with the central body.

2. The fuel injector of claim 1, wherein the central body includes a support structure surrounded by a heat shield forming a gap therebetween, the gap forming a portion of the cooling air passage.

3. The fuel injector of claim 1, further including a mounting structure for mounting the fuel injector to an engine case, the orifice cooling air inlet and cooling air outlet being positioned relative to the mounting structure such that the orifice cooling air inlet and cooling air outlet are both positioned within the engine case when the fuel injector is mounted thereto.

4. The fuel injector of claim 1, wherein the cooling system includes a heat exchanger forming a portion of the cooling air passage that extends into the nacelle air bypass flow path around the engine case and that is interposed between the cooling air inlet and cooling air outlet.

5. The fuel injector of claim 4, wherein the central body includes a mounting structure for mounting the fuel injector to an engine case, the heat exchanger being positioned relative to the mounting structure such that the heat exchanger is positioned external to the engine case in the nacelle air bypass flow path when the fuel injector is mounted thereto.

6. The fuel injector of claim 1, wherein the fuel outlet and cooling air outlet are positioned adjacent one another.

7. The fuel injector of claim 6, further including an atomizer, the cooling air outlet and fuel outlet formed by the atomizer.

8. The fuel injector of claim 7, wherein the central body includes a mounting structure for mounting the fuel injector to the engine case, the mounting structure being proximate an upstream end of the fuel injector while the atomizer is proximate a downstream end of the fuel injector.

9. The fuel injector of claim 5, wherein the orifice cooling air inlet and cooling air outlet are positioned relative to the mounting structure such that the orifice cooling air inlet and cooling air outlet are both positioned within the engine case when the fuel injector is mounted thereto.

10. The fuel injector of claim 9, wherein a portion of the cooling air passage between the orifice cooling air inlet and the heat exchanger passes through the mounting structure.

11. The fuel injector of claim 3, wherein the mounting structure is a radially outward extending flange including a first face facing an upstream end of the fuel injector and a second face facing a downstream end of the fuel injector, the second face facing the orifice cooling air inlet and cooling air outlet.

12. A turbine engine comprising: an engine case;
a nacelle positioned around the engine case forming a nacelle air bypass flow path therebetween to allow low temperature nacelle air to flow therethrough; a compressor within the engine case;
a compressor discharge area downstream of the compressor in which compressed air from the compressor is discharged at high pressure and high temperature;
a combustor within the engine case and positioned downstream from the compressor and the compressor discharge area, the combustor in fluid communication with the compressor discharge area through a combustor boundary wall, the combustor boundary wall creating a pressure differential between the combustor discharge area and the combustor such that the combustor is at a lower pressure than the compressor discharge area;
a fuel injector mounted within to the engine case, the fuel injector including a central body defining a fuel flow path having a fuel outlet within the combustor; and
a cooling system including at least one orifice that defined a cooling air passage, passing through and in thermal communication with the central body, the cooling air passage including an orifice cooling air inlet in the compressor discharge area for receiving the high pressure and high temperature compressed air from the compressor and a cooling air outlet in the combustor downstream of the combustor boundary wall, at least one portion of the cooling air passage interposed between the orifice cooling air inlet and cooling air outlet being external to the engine case and extending into the nacelle air bypass flow path in thermal communication with the low temperature nacelle air.

13. The turbine engine of claim 12, wherein the at least one portion of the cooling air passage is in thermal communication with the low temperature nacelle air external to the engine case flowing in the nacelle air bypass flow path for transferring heat energy to the low temperature nacelle air from high pressure and high temperature compressed air entering the orifice cooling air inlet from the compressor discharge area and exiting the cooling air outlet into the combustor downstream of the combustor boundary wall.

14. The turbine engine of claim 13, wherein the fuel injector further includes a heat shield surrounding, at least in part, the central body forming a gap therebetween, the gap forming a part of the cooling air passage.

15. The turbine engine of claim 12, wherein the engine case includes an aperture through which the central body extends, the fuel injector further including a mounting structure for securing the fuel injector within the aperture and to the engine case, a portion of the cooling air passage between the orifice cooling air inlet and the portion that is external to the engine case passing through the mounting structure for securing the fuel injector to the engine case.

16. The turbine engine of claim 15, wherein the mounting structure is a radially outward extending mounting flange that extends outward from the central body that overlaps a portion of an outer surface of the engine case.

17. The turbine engine of claim 12, further including a fuel supply path operably coupled to the fuel injector, the fuel supply path including a heat exchanger for transferring heat energy from fuel passing through the fuel supply path to the ambient.

18. The fuel injector of claim 1, wherein the high pressure and high temperature compressed air from the compressor is actively drawn into the orifice cooling air inlet by a pressure differential between the compressor discharge area in which the orifice cooling air inlet is located and the combustor in which the cooling air outlet is located.

19. The fuel injector of claim 4, wherein the high pressure and high temperature compressed air from the compressor is cooled by the low temperature nacelle air prior to flowing through the central body such that cooling of the fuel flowing through the fuel flow passage.

20. The turbine engine of claim 12, wherein the high pressure and high temperature compressed air from the compressor is actively drawn into the cooling air inlet by a pressure differential between the compressor discharge area in which the orifice cooling air inlet is located and the combustor in which the cooling air outlet is located.

* * * * *